United States Patent [19]

Le Marchand

[11] Patent Number: 4,527,664
[45] Date of Patent: Jul. 9, 1985

[54] DISC BRAKE WITH SLIDING CALIPER AND FRICTION COMPONENT PROVIDED WITH ELECTRICAL WEAR INDICATOR

[75] Inventor: Claude Le Marchand, Domont, France

[73] Assignee: Societe Anonyme D.B.A., Paris, France

[21] Appl. No.: 575,617

[22] Filed: Jan. 31, 1984

[30] Foreign Application Priority Data

Feb. 2, 1983 [FR] France .................. 83 01619

[51] Int. Cl.³ ............................. B60T 17/22
[52] U.S. Cl. .................. 188/1.11; 188/73.38
[58] Field of Search ............. 188/1.11, 73.31, 73.36, 188/73.37, 73.38; 340/52 A

[56] References Cited

U.S. PATENT DOCUMENTS

| | | | |
|---|---|---|---|
| 2,265,393 | 12/1941 | Place | 24/73 |
| 2,985,932 | 5/1961 | Windish | 24/81 |
| 3,023,470 | 3/1962 | Patten | 24/73 |
| 4,491,204 | 1/1985 | Dirauf et al. | 188/73.38 |

FOREIGN PATENT DOCUMENTS

| | | |
|---|---|---|
| 2854357 | 7/1980 | Fed. Rep. of Germany . |
| 2111070 | 6/1972 | France . |
| 2420692 | 10/1979 | France . |
| 917898 | 2/1963 | United Kingdom . |
| 1384492 | 2/1975 | United Kingdom ............... 188/1.11 |
| 1582567 | 1/1981 | United Kingdom . |

*Primary Examiner*—Duane A. Reger
*Attorney, Agent, or Firm*—Larry J. Palguta; Ken C. Decker

[57] ABSTRACT

A sliding key (10), interposed between the end (5) of an arm (4) of the fixed support (1) and the adjacent profiled end (60, 70) of the sliding caliper (8), is immobilized axially by a component (15), advantageously elastic, having end portions (16) cooperating in engagement with the axially opposed ends of the key (10) and joined by an intermediate portion (20) of undulating profile defining with the adjacent outside zone of the end (5) of the arm (4) a channel (24) for a wire conductor (25) to pass through, for connection to a pad wear detector, brought to the side of the brake opposite this pad.

6 Claims, 5 Drawing Figures

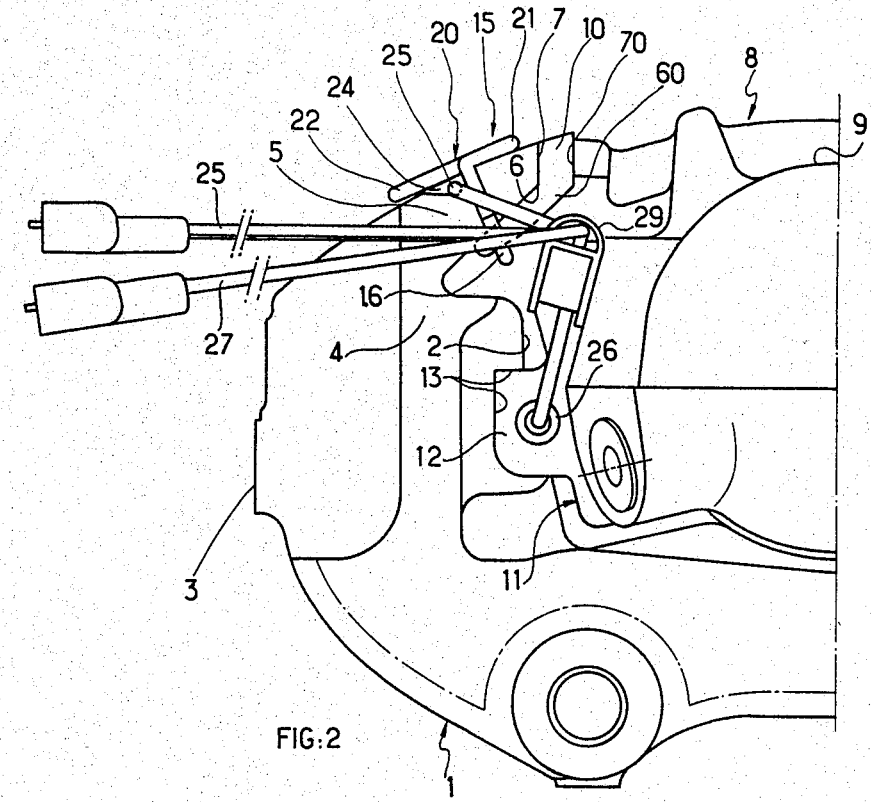
FIG: 2
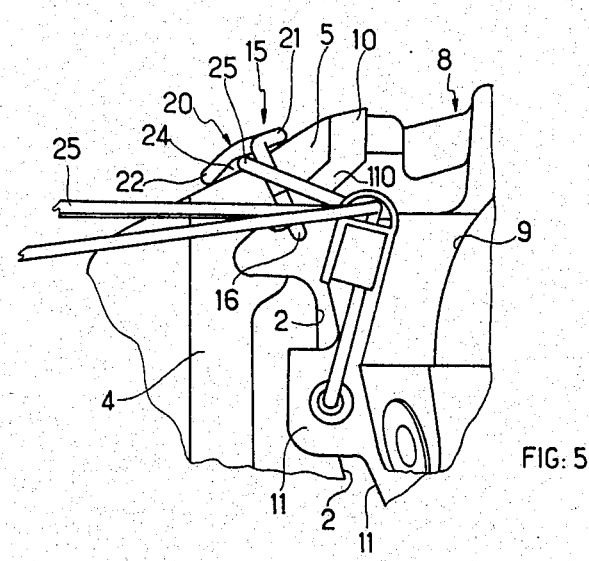
FIG: 5

DISC BRAKE WITH SLIDING CALIPER AND FRICTION COMPONENT PROVIDED WITH ELECTRICAL WEAR INDICATOR

The present invention concerns disc brakes with a sliding caliper and with a friction component provided with an electrical wear indicator.

The invention concerns disc brakes of the type consisting of a fixed support defining a central opening bounded peripherally by two arms and in which slide a pair of friction components and a caliper incorporating at least one brake actuator for operating the friction components, at least one key being interposed between a surface formed internally on the end of one of the arms of the fixed support and a corresponding adjacent surface of the caliper, in such a way as to lock the caliper radially in the opening of the fixed support, means being provided for immobilizing the key axially relative to the end of the arm of the fixed support.

Such a brake construction is described in the second Certificate of Addition No. 88,388 to French Pat. No. 1,431,745.

The present invention concerns more particularly a brake of the above type, incorporating in addition an immobilized component to immobilize the key axially, incorporating end portions cooperating in engagement with the axially opposed ends of the key. A brake of this type is described in French Patent Application No. FR-A-2,221,647 where the locking component consistds of an elastic leaf interposed between a sliding surface of the key facing upwards and a corresponding sliding surface of the caliper, the key, of the same width as the corresponding end of the arm, being retained by the end portions of the locking component which incorporate fingers arranged to grip the axially opposed edges of the end of the arm.

In modern vehicles, such disc brakes are now generally equipped with friction components provided with electrical wear indicators each linked to a display and monitoring device of the vehicle by a connecting wire conductor. Although the wear indiciator of the inside friction component of the brake (on the chassis side of the vehicle) presents no special problem as regards its connection to the vehicle circuitry, it is not the same for the wear indicator of the outside friction component of the brake whose connecting wire conductor must be brought towards the inner side of the brake, outside the disc, in a zone where it is not capable of interfering with the rim of the wheel which shields the brake at least partially, if possible away from the hot zones of the brake. Now, these brakes are not usually provided with means for guiding the wire conductor, which is most often simply folded back towards the inside of the brake over the periphery of the caliper or of the fixed support. An additional device specifically for holding and guiding the wire conductor of a wear indicator away from the brake structure is described in the document FR-A-2,399,576. The system described in the said document, however, requires specific additional components involving the manufacturing and assembly costs of the brake and considerably increasing the radial dimensions of the latter.

The document EP-A-0,030,184, on the other hand, describes a disc brake with a caliper sliding on axial pillars relative to a fixed support component, the friction components sliding relative to the caliper through the intermediary of at least one key axially immobilized relative to the caliper by means of an elastic immobilizing component whose end portions cooperate in engagement with the axially opposed ends of the key, axially both sides of the adjacent zone of the caliper, these end portions being joined by an intermediate portion bearing on an adjacent surface of the caliper and extending axially immediately above the key in the space between this surface of the caliper and the ends of the sliding fingers of the friction components, that is to say in an exposed zone of the brake which must be kept perfectly free so as to ensure the sliding of the friction components.

An object of the present invention is to propose an arrangement of a brake of the type defined above, providing simple and effective locking of the key and performing at the same time, without additional special components, effective and reliable guiding and positioning of the wire conductor for the wear indicator in a zone of the brake where conditions are not very aggressive.

To achieve this, according to a feature of the invention, in a disc brake of the type being considered, in which at least the outer friction component is provided with an electrical wear detector, the end portions of the locking, e.g. immobilizing component of the key are joined by an intermediate portion straddling externally the end of the arm of the fixed support and defining at least partially, together with the adjacent outside zone of this end of the arm, a channel for the wire conductor to pass through for connection to the electrical wear detector.

According to another feature of the invention, this outside zone of the end of the arm has a portion recessed inwards lying essentially axially vertically below the intermediate portion of the immobilizing component in the mounted configuration in the brake. The immobilizing component is advantageously elastic and made from a metal wire whose intermediate portion has an undulating profile extending transversely at least once, covering the portion of the end of the arm which is recessed inwards.

Other features and advantages of the present invention will emerge from the following description of embodiments, given by way of illustration but not limiting, with reference to the accompanying drawings, in which:

FIG. 2 is a view showing one half of the inner side of a brake according to the invention;

FIG. 5 is a partial view similar to that of FIG. 2 showing another embodiment of a carrying channel according to the invention.

Figure 1:
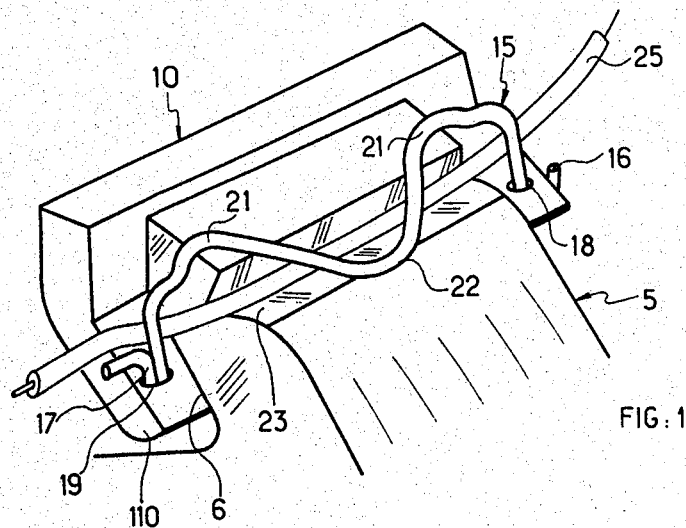
FIG. 1 is a schematic perspective view showing the arrangement of a channel for carrying a connecting wire conductor according to the invention.

As shown in the drawings, a disc brake according to the invention comprises a fixed support 1 defining a central opening 2 in the general shape of a U open towards the top, bounded peripherally (that is to say as seen in the direction of rotation of the disc 3 associated with the brake) by two arms, such as that shown at 4, terminated by ends 5 which converge towards each other so as partially to close the opening of the U and to define at each end of the arm a sliding surface facing inwards, 6, extended outwards by an upright sliding face 7. A caliper 8 is mounted in the opening 2 so as to slide, and incorporates, on its inner side, at least one brake actuator 9, and whose peripherally opposed end zones form sliding surfaces 60 and 70 essentially parallel to the corresponding sliding surfaces 6 and 7 of the arms 4 of the fixed support 1, a key 10 having an angled shape with a corresponding profile being interposed between these sliding surfaces 6, 60 and 7, 70. The brake also incorporates a pair of friction components 11, of which the inner friction component is visible in FIGS. 2 and 5, capable of being operated by the actuator 9 of the caliper 8 and mounted so as to slide in the fixed support 1 by means of lateral projections 12 which enter rebates 13 with a profile corresponding to the opening 2 in the region of the intermediate zone of the arms 4.

Figure 3:
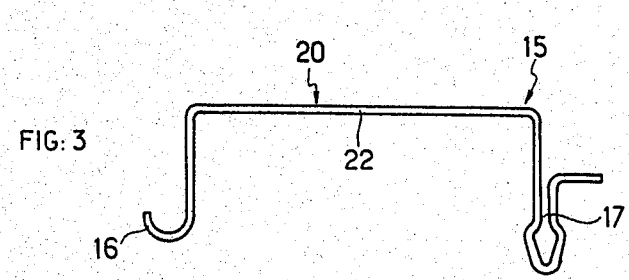
FIGS. 3 and 4 are views from the front and above, respectively, of the immobilizing component of the key for the embodiment shown in FIGS. 1 and 2.
Figure 4:
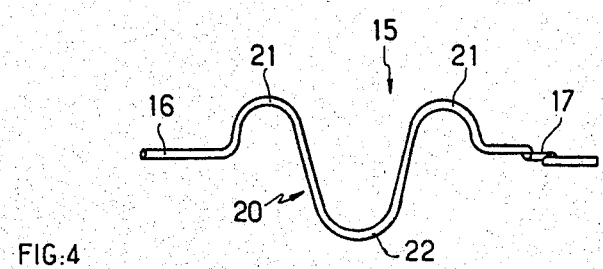

In accordance with the invention, the key 10 is immobilized axially relative to the end 5 of the arm 4 of the fixed support 1 by an immobilizing component 15 which is made, in the embodiments shown, from an elastic metal wire, having end portions 16 and 17 which enter into engagement with through holes 18 and 19, respectively, formed in the axially opposed ends, projecting beyond either side of the end 5 of the arm 4, of the wing 110 of the key 10 interposed between the sliding surface 6, facing inwards, of the end 5 of the arm 4 and the corresponding sliding surface 60 of the caliper 8. The end portions 17 and 18 extend essentially radially outwards and are joined to each other by an intermediate portion 20 straddling externally the end 5 and forming, in the example shown, two convolutions 21 in one direction joined by a central convolution in the other direction 22, the intermediate portion 20 lying, as may be seen in FIG. 3, in a plane essentially perpendicular to the end portions 16 and 17 and essentially at a tangent to the outside peripheral surface of the end 5. In the example shown, the end portion 16 is profiled in the shape of a hook and is engaged first in the opening 18 of the key 10, the other end portion 17 being profiled in the shape of a non-return fastener which is elastically forced into the corresponding hole 19 of the key, the intermediate portion 20 straddling externally, in the mounted configuration, the end 5 of the arm 4 of the fixed support 1.

In the embodiment shown in FIGS. 1 and 2, this end portion 5 of the arm 4 incorporates a rebate or axial groove 23 recessed radially relative to the outside profile of the end 5 of the arm 4, this groove 23 being arranged in such a way that, in the mounted configuration, it is partially closed by parts of the intermediate portion 20 of the immobilizing component 15, as may be seen clearly in FIG. 1. The undulating intermediate portion 20 and this groove 23 thus define an axial channel 24 for the wire conductor 25 to pass through for connecting to the wear indicator of the outer friction component, which may be of the type shown at 26 for the inner pad, whose connecting wire conductor carries the reference 27. The connecting wire conductor 25 may thus be brought from one side of the brake to the other in the channel 23, being perfectly retained and guided and without being subjected to any special restraints. As shown in FIG. 2, the two connecting wire conductors 25 and 27 of the two wear detectors for the friction components may be grouped at a return component 29 carried for example by the caliper 8.

In the variant of construction shown in FIG. 5, the outside profile of the end 5 of the arm 4 is provided locally with a non-convex outside profile, slightly concave for example, the intermediate portion 20 of the immobilizing and guiding component 15 being, on the other hand, transversely convex so as to create centrally, with the periphery of the end 5, the channel 24 for the wire 25 to pass through.

Although the present invention has been described in relation to particular embodiments, it is not limited by them, and is, on the contrary, capable of modifications and variants which will be apparent to a person versed in the art. In particular, the intermediate portion 20 of the immobilizing component 15 may have any suitable profile provided that it straddles the groove 23 in at least one position or forms at least two arches for the wire 25 to pass through. Similarly, the immobilizing component 15 may be made from sheet metal suitably stamped out and profiled to provide the axial immobilizing functions of the key 10 cooperating with the ends projecting axially from the latter both sides of the end 5 of the arm 4 and forming, outside this end 5, a channel for the wire 25 to pass through.

I claim:

1. Disc brake comprising a fixed support defining a central opening delimited peripherally by two arms and in which slide a pair of friction components, and a caliper incorporating at least one brake actuator for operating the friction components, at least one key being interposed between a surface formed internally on the end of one of the arms of the fixed support and a corresponding adjacent surface of the caliper, the key being immobilized axially relative to the end of the arm by an immobilizing component incorporating end portions cooperating in engagement with the axially opposed ends of the key, at least the outer friction component of the brake being provided with an electrical detector for the wear of the lining of this friction component, incorporating a connecting wire conductor, characterized in that the end portions of the immobilizing component are joined by an intermediate portion straddling externally the end of the arm of the fixed support and defining, at least partially, together with the adjacent outside zone of this end of the arm, a channel for the connecting wire conductor to pass through.

2. Disc brake according to claim 1, characterized in that the outside zone of the end of the arm has a portion recessed inwards lying essentially axially vertically below the intermediate portion immobilizing of the component.

3. Disc brake according to claim 1, characterized in that the immobilizing component is elastic.

4. Disc brake according to claim 3, characterized in that the immobilizing component is made from elastic metal wire.

5. Disc brake according to claim 4, characterized in that the intermediate portion of the immobilizing component has an undulating profile and lies essentially in a plane perpendicular to the end portions.

6. Disc brake according to claim 5, characterized in that the end portions enter into recesses in the axially opposed ends of the portion of the key cooperating with the surface formed internally in the end of the arm of the fixed support.

* * * * *